United States Patent

Schulman

[15] 3,645,259
[45] Feb. 29, 1972

[54] CREWMAN'S HEAD POSITIONING AND RESTRAINING DEVICE

[72] Inventor: Marvin Schulman, Broomall, Pa.
[73] Assignee: The United States of America as represented by the Secretary of the Navy
[22] Filed: Oct. 23, 1970
[21] Appl. No.: 83,378

[52] U.S. Cl. ................................................128/133, 2/6
[51] Int. Cl. .................................................A42b 3/02
[58] Field of Search..................128/133, 132, 134, 1 R, 1 A; 9/301–303, 314, 316, 318, 333, 345; 244/122 R, 122 AG, 122 AE, 122 B; 297/384, 390, 392; 2/3, 6

[56] References Cited

UNITED STATES PATENTS

| | | | |
|---|---|---|---|
| 2,335,474 | 11/1943 | Beall | 128/1 |
| 2,676,586 | 4/1954 | Coakwell | 128/1 |
| 3,414,920 | 12/1968 | Beaton | 9/316 |
| 3,438,060 | 4/1969 | Lobelle et al. | 2/6 |

Primary Examiner—Richard A. Gaudet
Assistant Examiner—J. B. Mitchell
Attorney—R. S. Sciascia and A. W. Collins

[57] ABSTRACT

Subject invention relates to novel and improved apparatus for maintaining an individual's head in an optimum position with respect to other portions of his body during the application of high acceleration and/or deceleration forces thereon. The improved apparatus includes a normally noninflated inflatable bag which is positioned beneath the pilot's chin and which is removably secured at opposite ends to the ear lobe portions of the pilot's helmet, and means for quickly inflating the bag when a high acceleration or deceleration force occurs. The bag is designed such that in its noninflated condition, it may be folded into a compact band that is readily and comfortably attached to the chin strap of the helmet.

7 Claims, 9 Drawing Figures

PATENTED FEB 29 1972 3,645,259

INVENTOR.
MARVIN SCHULMAN
BY
ATTORNEY

INVENTOR.
MARVIN SCHULMAN
BY
ATTORNEY

CREWMAN'S HEAD POSITIONING AND RESTRAINING DEVICE

In aircraft ejection and crash situations, it is imperative that the pilot or other aircraft seat occupant be adequately positioned and restrained so that he may best withstand the damaging effects of sudden acceleration and deceleration forces. Present systems restrain nearly every critical portion of the occupant's body except his head. Experts generally agree that head positioning and restraint are highly desirable in order to reduce the likelihood of vertebral and other damage or death due to uncontrolled rotation and movement of the head. Although complex cable restraining systems and other complicated and cumbersome systems have been proposed heretofore for this purpose, considerable difficulty has been experienced in the past in providing apparatus which satisfies the requirements of safety, reliability and convenience in a practical and effective manner.

It is therefore a principal object of the invention to provide novel and improved apparatus for positioning and restraining movement of an individual's head with respect to his body during periods of high acceleration or deceleration.

It is a further object of the invention to provide novel and improved apparatus which properly positions and restrains movement of an aircraft pilot's head during periods of acceleration and deceleration and which under normal flight conditions provides maximum comfort and freedom of movement.

Other objects and many of the attendant advantages of this invention will be readily appreciated as the same becomes better understood by reference to the following detailed description when considered in connection with the accompanying drawings wherein.

Figure 1:
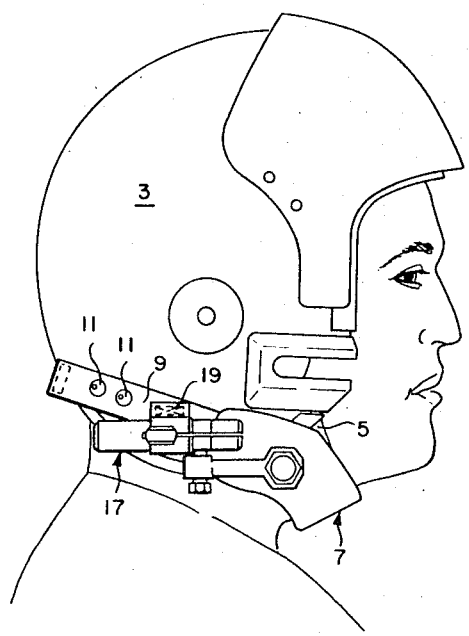
FIG. 1 is a side view of a preferred embodiment of the invention showing the inflatable bag in its normal folded condition on the helmet and the helmet chin strap.
Figure 2:
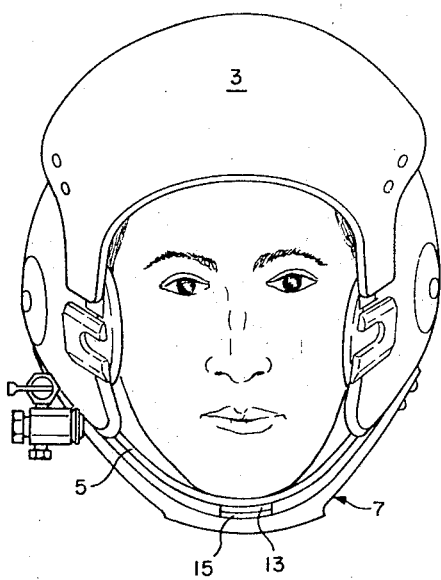
FIG. 2 is a frontal view of the embodiment of the invention shown in FIG. 1.
Figure 3:
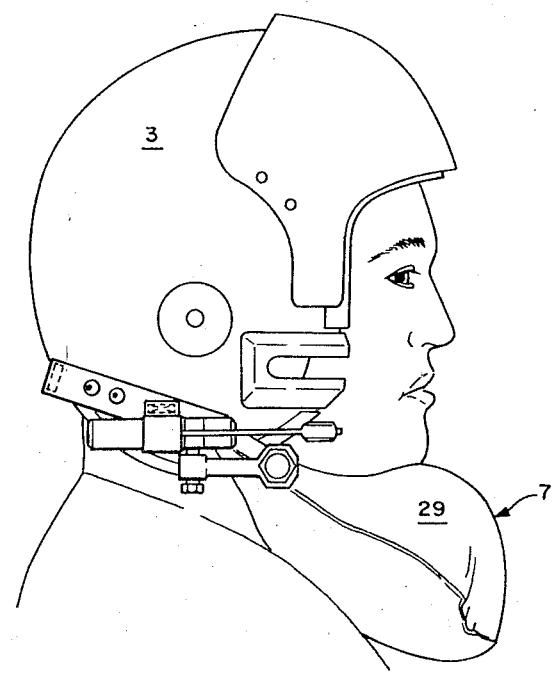
FIG. 3 is the side view of the invention shown in FIG. 1 with the bag in its inflated head positioning and restraining condition.
Figure 4:
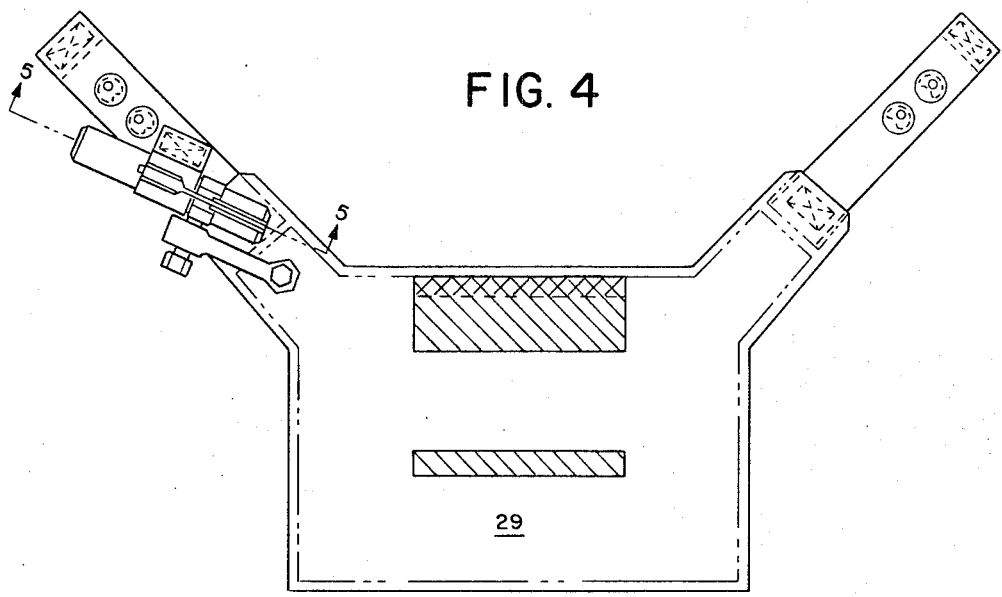
FIG. 4 is a plan view of the inflatable bag assembly of the invention in its noninflated unfolded condition.
Figure 4A:
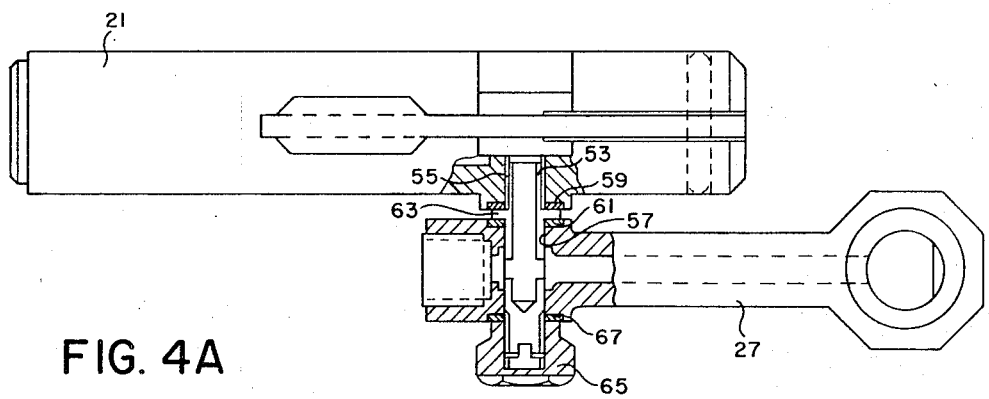
FIG. 4a is an enlarged detail view partly in section of the bag inflating mechanism of the invention.
Figure 5:
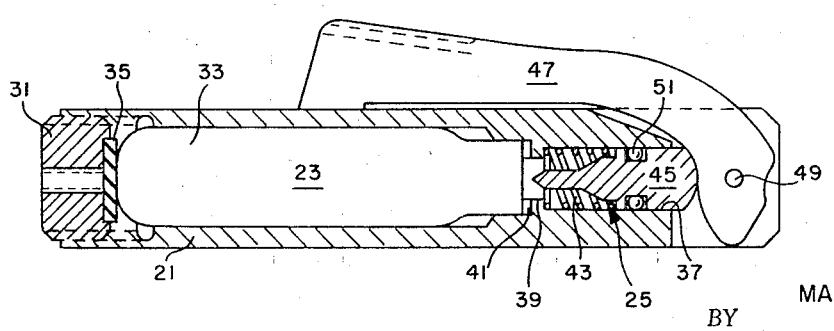
FIG. 5 is a sectional view of the bag inflating device along reference line 5—5 in FIG. 4.

Referring now to the various figures of the drawing, the protective helmet 3 is of any suitable conventional design and preferably includes a rigid shell that extends downwardly over each ear lobe portion of the pilot or individual wearing the helmet. The helmet chin strap 5 is secured in any suitable manner to opposite ear lobe portions of the helmet and when in its helmet securing position extends beneath the chin of the individual. The generally rectangularly shaped inflatable bag assembly 7, which is preferably constructed of a neoprene coated nylon material, is removably attached to opposite sides of the helmet 3 by the straps 9 and a plurality of snap devices 11 to accommodate various percentile fits. The bag or bag assembly 7 is also removably secured to the chin strap 5 of the helmet by the VELCRO hook and pile fastening devices 13 and 15, in a manner which will be more apparent hereinafter. Although not shown on the drawing, where a chin strap chin pad is used with the helmet, the bag assembly 7 could be secured to the chin pad or be an integral part of the same without departing from the spirit or scope of the invention.

The bag gas inflating device 17 which is secured to the bag assembly 7 by the fabric loop 19 on the strap 9 includes a valve body 21, a pressurized carbon dioxide, or nitrogen or other suitable gas cartridge 23 and a cartridge puncturing mechanism 25 in the valve body, and the gas manifold 27 which interconnects the valve body 21 with the bag 29. The cartridge 23 is removably positioned in the valve body 21 by the retainer element 31 which threadedly engages the internal walls of the cylindrical chamber 33 in one end of the valve body 21. The cushion element 35 is preferably positioned between the retainer element 31 and the cartridge 23. The reduced diameter aperture 37 extends through the other end of the valve body 21 along the longitudinal axis of chamber 33. The inwardly directed flange 39 between the chamber 33 and the aperture 37 provides a seat for the inner end of the cartridge 23 and the annular gasket 41 on its one side and an internal seat on its other side for the helical spring 43 which biases the cartridge piercing pin 45 outwardly against the cammed operating lever 47. Lever 47 is pivotably mounted on the valve body 21 at 49 for manual control of inflation of the bag 29 in a manner which will be more apparent hereinafter. The O-ring 51 positioned in the annular groove in the pin 45 prevents escape of gas through the outer extremity of the aperture 37.

The tubular stem 53 threadedly engages the aperture 55 in the valve body 21 and the aperture 57 in one end of the manifold 27. Gaskets 59 and 61 on opposite sides of the outwardly extending flange 63 on stem 53 permit rotation of the manifold 27 with respect to the valve body 21 without the loss of gas from the system. The cap 65 and gasket 67 over the outer screw driver slotted end of stem 53 facilitates ready assembly and disassembly of the device. The other end of the manifold is connected to the interior of the bag 29 in any suitable manner.

Figure 6:
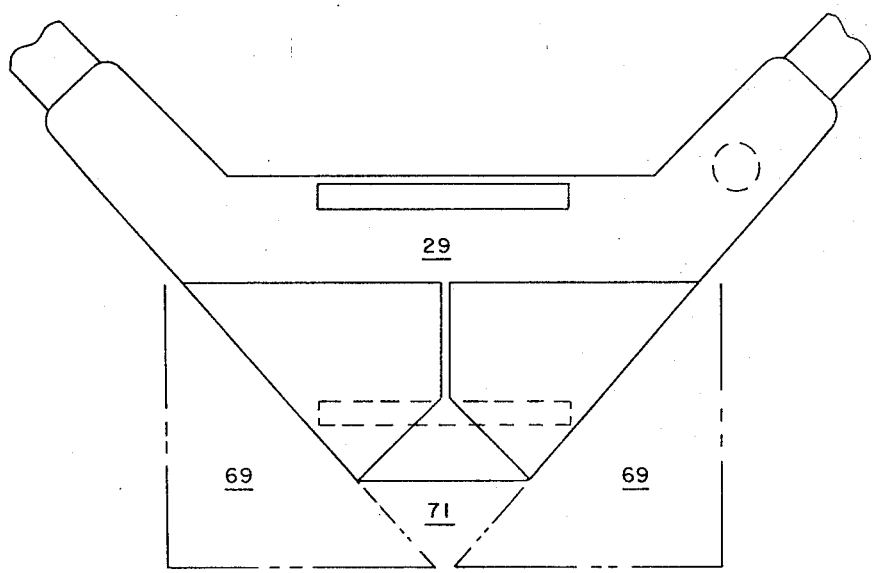
FIGS. 6–8 are plan view of various stages of the bag folding process used in the invention.
Figure 7:
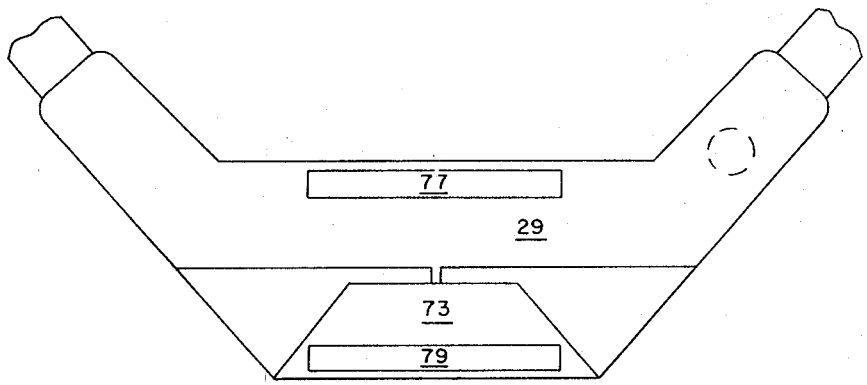
Figure 8:
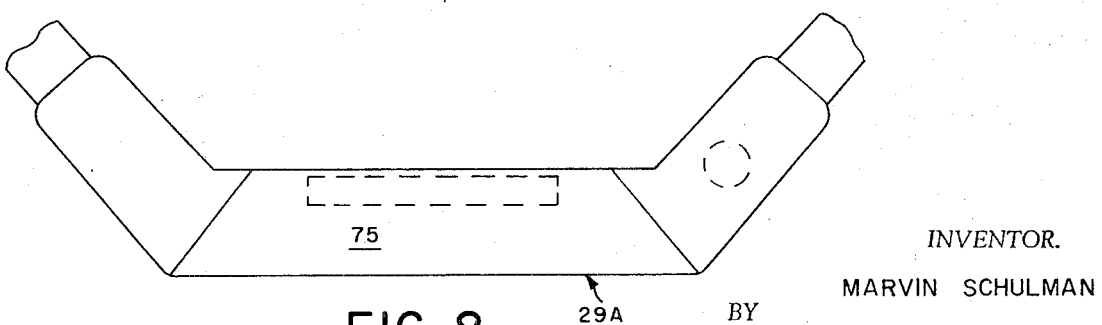

Referring now to FIGS. 6–8 of the drawing, it will be noted that the generally rectangular inflatable bag 29 may be readily folded into a compact band 29A prior to its attachment to the chin strap of the helmet. More specifically, triangular edges 69 of the bag 29 are first folded upwardly as shown in FIG. 6 of the drawing. The triangular tab 71 is then folded upwardly as also shown in FIG. 6. The trapezoidal section 73 is then folded upwardly as shown in FIG. 7. The trapezoidal section 75 is then folded upwardly as shown in FIG. 8 and secured in that position by the hook and pile fasteners 77 and 79 on opposite sides of the bag.

In operation, a charged gas cartridge 23 is first inserted and secured in the valve body 21 of the bag inflation device 17. The bag 29 is then folded into its compact condition in the manner described hereinabove. The bag assembly 7 is then secured to the helmet 3 and the chin strap 5 of the helmet by the snap devices 11 and the hook and pile fasteners 13 and 15. In an emergency situation where high acceleration or deceleration forces are expected to occur, the pilot operates lever 47. Operation of lever 47 to its outwardly extended position causes the pin 45 to move inwardly against the bias of spring 43 and puncture the end of cartridge 23. Pressurized gas in the cartridge 23 then flows through the aperture 37 in the valve body 21, through the stem 53 and through the manifold 27 into the bag. Inflation of the bag causes the pilot's head to assume an optimum position with respect to other parts of his body. In the event that the inflated bag 29 should impede the pilot's breathing process at any time, the assembly 7 can be readily and quickly removed from the helmet 3 by disengaging the snap devices 11.

It is to be understood that although a manually operated cartridge puncturing device is shown and described herein, the cartridge could be punctured by an electrically controlled squib device, an impact sensor device or any other suitable device without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. In combination with a protective helmet having lobes that extend downwardly opposite the ears of an individual wearing said helmet and having a chin strap extending between said lobes apparatus for maintaining the individual's head in an optimum position with respect to his neck, shoulders and other parts of his body during the application of high acceleration forces on the body, said apparatus comprising:
- a. a normally noninflated inflatable bag which is adapted to be positioned beneath the individual's chin and which is removably secured at opposite ends to the ear lobe portions of the helmet, said bag being of such a volume, when inflated, to prevent the chin of the individual from contacting his chest area;
- b. and means for inflating the bag including a source of pressurized gas and means to activate same.

2. The apparatus substantially as described in claim 1 and further including means for maintaining the inflatable bag in a compact folded condition until a predetermined acceleration force occurs.

3. The apparatus substantially as described in claim 2 wherein the inflatable bag when in its folded condition is secured to said chin strap on the helmet.

4. The apparatus substantially as described in claim 3 wherein hook and pile fastening devices are employed to normally maintain the bag secured to the chin strap in its folded condition.

5. The apparatus substantially as described in claim 1 wherein the means for inflating the bag includes a gas generator coupled to the bag and a manual lever that controls flow of gas from the generator into the bag.

6. The apparatus substantially as described in claim 5 wherein the gas used in the gas generator is carbon dioxide.

7. The apparatus substantially as described in claim 5 wherein the gas used in the gas generator is nitrogen.

* * * * *